(12) United States Patent
Rohr et al.

(10) Patent No.: US 10,000,114 B2
(45) Date of Patent: Jun. 19, 2018

(54) TRUCK CAP WITH HEAVY DUTY MOUNTING RACK

(71) Applicant: A.R.E. Accessories, LLC, Ann Arbor, MI (US)

(72) Inventors: Andrew N. Rohr, Wadsworth, OH (US); Aaron N. Yonts, Marshallville, OH (US)

(73) Assignee: A.R.E. Accessories, Ann Arbor, MI (US)

( * ) Notice: Subject to any disclaimer, the term of this patent is extended or adjusted under 35 U.S.C. 154(b) by 0 days. days.

(21) Appl. No.: 15/245,717

(22) Filed: Aug. 24, 2016

(65) Prior Publication Data

US 2016/0361982 A1 Dec. 15, 2016

Related U.S. Application Data

(63) Continuation of application No. 14/602,325, filed on Jan. 22, 2015, now Pat. No. 9,440,520.

(51) Int. Cl.
| | |
|---|---|
| *B60J 7/16* | (2006.01) |
| *B60R 9/06* | (2006.01) |
| *B60R 9/048* | (2006.01) |
| *B60R 9/058* | (2006.01) |

(52) U.S. Cl.
CPC ............. *B60J 7/1607* (2013.01); *B60R 9/048* (2013.01); *B60R 9/058* (2013.01); *B60R 9/06* (2013.01)

(58) Field of Classification Search
CPC .............. B60P 3/40; B60R 9/04; B60J 7/1607
USPC ............ 296/3, 37.6, 100.01, 100.02, 100.11, 296/100.12, 100.17, 100.18
See application file for complete search history.

(56) References Cited

U.S. PATENT DOCUMENTS

| | | |
|---|---|---|
| 4,496,184 A | 1/1985 | Byrd et al. |
| 5,531,497 A | 7/1996 | Cheng |
| 5,927,782 A | 7/1999 | Olms |
| 6,347,731 B1 | 2/2002 | Burger |
| 6,439,646 B1 | 8/2002 | Cornelius |

(Continued)

OTHER PUBLICATIONS

NPL document Hilux Canopy and Canopy Roof Racks for Roof Top Tent—Outbackjoe; published Jul. 2012; located at https://outbackjoe.com/macho-divertissement/macho-articles/hilux-canopy-and-canopy-roof-racks-for-roof-top-tent/. (Year: 2012).*

(Continued)

*Primary Examiner* — Jason S Daniels
(74) *Attorney, Agent, or Firm* — Harness, Dickey & Pierce, P.L.C.

(57) ABSTRACT

A frame can include front and back generally vertically and laterally extending frame members. The frame members can each have a generally trapezoidal configuration comprising a crossbeam portion extending generally laterally between two generally upwardly and laterally inwardly extending side leg portions. A rigid, non-collapsible shell can extend over the frame that is adapted to be supported on the truck body. The rigid, non-collapsible shell can include opposite side walls and a roof extending between the side walls. A plurality of posts can be attached to the frame through the roof, with each of the posts extending externally above the roof of the rigid, non-collapsible shell. A first rack can be attached to and can extend between at least two of the posts externally of the rigid, non-collapsible shell overlying the roof.

23 Claims, 8 Drawing Sheets

(56) References Cited

U.S. PATENT DOCUMENTS

| | | |
|---|---|---|
| 7,198,185 B2 | 4/2007 | Storer |
| 7,959,200 B2 | 6/2011 | Voglmayr |
| 8,087,716 B2 | 1/2012 | Kramer |
| 2003/0164621 A1 | 9/2003 | Krause |
| 2003/0168879 A1 | 9/2003 | Grudek |
| 2010/0194137 A1 | 8/2010 | Kealy |
| 2014/0367990 A1* | 12/2014 | Dost .................... B62D 33/044 296/100.17 |

OTHER PUBLICATIONS

OutbackJoe, Hilux Canopy and Canopy Roof Racks for Roof Top Tent, last updated Jul. 18, 2013, htpps://web.archive.org/web/20141026171243/https://outbackjoe.com/macho-divertissement.

\* cited by examiner

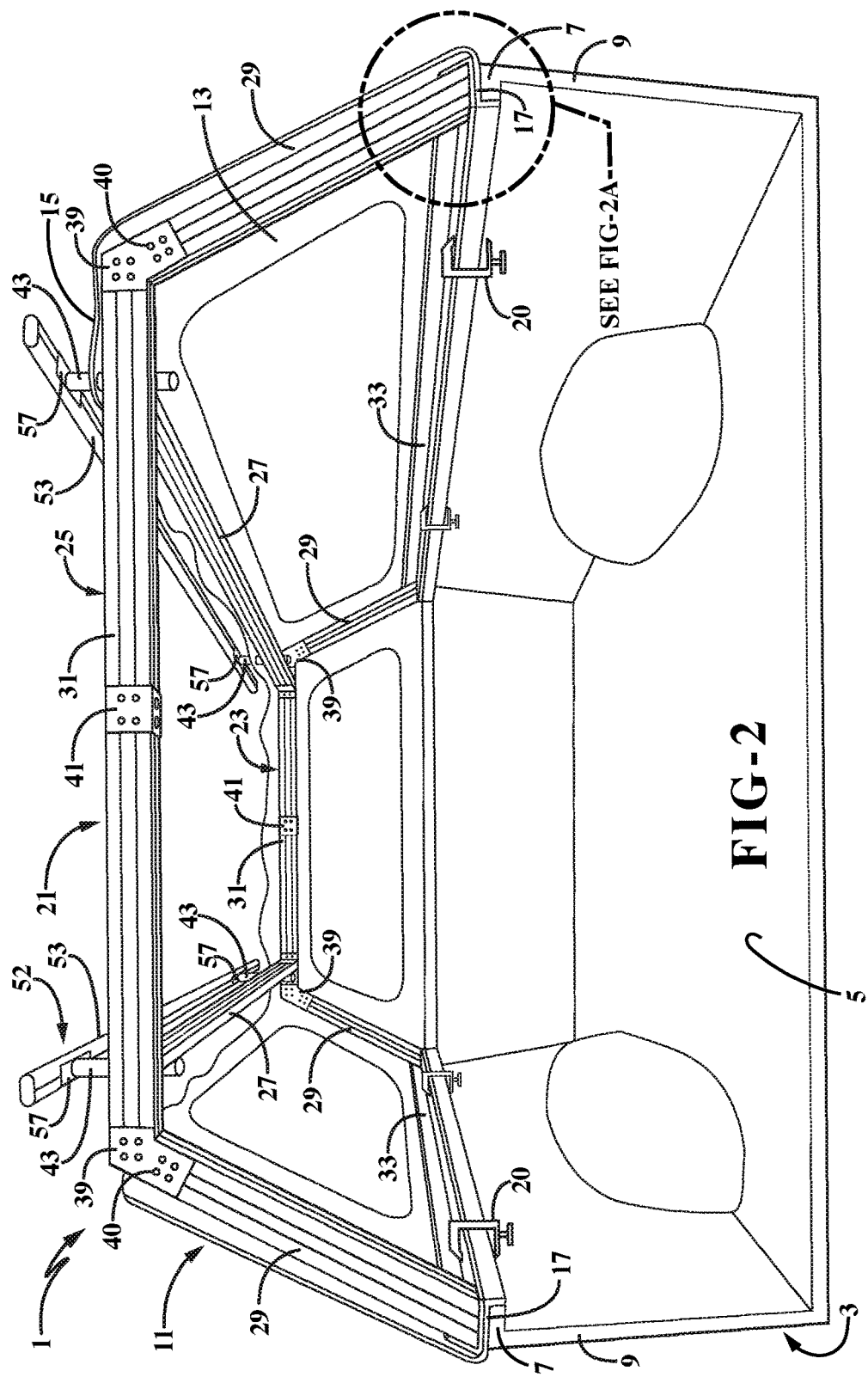

TRUCK CAP WITH HEAVY DUTY MOUNTING RACK

CROSS-REFERENCE TO RELATED APPLICATIONS

This application is a continuation of U.S. patent application Ser. No. 14/602,325 filed on Jan. 22, 2015. The entire disclosure of the above application is incorporated herein by reference.

FIELD

The present disclosure relates to truck caps and, in particular, to an outer shell in combination with an internal rigid frame and an exterior mounting rack able to support heavy loads. Even more particularly, the invention relates to such a truck cap in which the weight of the heavy load that is supported on an external rack is supported by the truck body through the internal frame concealed within the cap shell.

BACKGROUND

A considerable number of pickup-type trucks are used by individuals for many types of business activities or just as a personal vehicle. These pickup trucks have an open rear bed or cargo area which is exposed to the weather. Various types of enclosures are used to protect this cargo area from the weather and to secure cargo, tools, etc. stored in the rear area from theft. These enclosures are referred to as a shell, canopy, topper, bed cap, box cap etc. and come in numerous configurations and sizes. These enclosures are usually attached to and supported by the side rails or frame of the truck body which form two sides of the open cargo area. Many of these enclosures are made of fiberglass, aluminum, wood etc., with fiberglass being the most common.

Many of these pickup trucks are used in various industries and hold various types of tools and other equipment for use on a job site. However, due to the construction of the enclosure, usually of a lightweight material such as fiberglass, they are not able to support appreciable weight, even though it is desirable to mount ladders and other equipment on top of the enclosure. In order to be able to accommodate greater loads, the enclosure must be made of a more rigid material with internal reinforcing, which adds appreciable to the weight, size, and cost for the truck enclosure or have a type of support frame which extends externally about the weather-proof shell such as shown in U.S. Pat. No. 8,087,716. Although some of these prior art reinforced caps and external frames enable the external load to be heavier than heretofore possible, they increase the cost of the truck enclosure, increase the external size of the vehicle cap and detract from the appearance thereof.

Therefore, there is a need for an improved truck enclosure or cap for the rear cargo area which is able to support greater loads externally of the enclosure adjacent the top thereof without detracting from the appearance of the vehicle while still providing weather-proof protection for the heretofore open truck bed or cargo area.

SUMMARY

In one aspect of the present disclosure, a truck cap can include a frame for mounting on a truck body. The frame can include front and back generally vertically and laterally extending frame members. The frame members can each have a generally trapezoidal configuration comprising a crossbeam portion extending generally laterally between two generally upwardly and laterally inwardly extending side leg portions. A rigid, non-collapsible shell can extend over the frame that is adapted to be supported on the truck body. The rigid, non-collapsible shell can include opposite side walls and a roof extending between the side walls. A plurality of posts can be attached to the frame through the roof, with each of the posts extending externally above the roof of the rigid, non-collapsible shell. A first rack can be attached to and can extend between at least two of the posts externally of the rigid, non-collapsible shell overlying the roof.

In another aspect of the present disclosure, a truck cap for mounting on a truck having a cargo bed can include a rigid frame. The rigid frame can include front and back frame members. Each of the frame members can include a crossbeam portion extending generally laterally between two frame corners and a pair of generally upwardly and laterally inwardly extending side legs joining the two corners, respectively. The rigid frame can be designed to be supportable by the cargo bed of the truck to extend over the cargo bed. A rigid, non-collapsible shell can cover the rigid frame. The rigid, non-collapsible shell can include a shell roof extending between and joined to a pair of shell side walls at shell corners with each crossbeam portion of the frame extending adjacent the shell roof and each side leg of the frame extending adjacent the shell side walls, respectively. The rigid, non-collapsible shell being can be arranged about the frame such that the crossbeams are disposed below the roof and are spaced apart therefrom. A plurality of posts can be attached to the rigid frame through the shell roof between the shell corners. Each of the posts can extend externally above the roof of the rigid, non-collapsible shell. A first rack can be attached to and can extend between at least two of the posts externally of the rigid, non-collapsible shell overlying the roof. When a weight of a load is supported on the rack and the rack is mounted on the truck, the weight can be transferred to the truck through the rigid frame.

In another aspect of the present disclosure, a truck cap for mounting on a truck having a cargo bed can include a rigid frame for mounting on the truck to overlie the cargo bed. The rigid frame can include front and back generally vertically and laterally extending frame members. The frame members can each have a generally trapezoidal configuration including a crossbeam extending generally laterally between two generally upwardly and laterally inwardly extending side legs. A rigid, non-collapsible shell can extend over the frame that is adapted to be supported on the truck to overlie the cargo bed. The rigid, non-collapsible shell can include opposite shell side walls and a roof extending between and joined to the shell side walls. The rigid, non-collapsible shell can extend over the rigid frame with each crossbeam of the rigid frame being spaced apart from the shell roof, and with each side leg of the rigid frame extending adjacent to one of the shell side walls.

DRAWINGS

Sample embodiments of the invention are set forth in the following description, are shown in the drawings and are particularly and distinctly pointed out and set forth in the appended claims.

FIG. 2 is a fragmentary rear view of the truck body with the tailgate removed and part of the shell broken away showing the rigid internal frame of the improved truck cap mounted thereon;

Similar numbers refer to similar parts throughout the drawings.

DETAILED DESCRIPTION

Figure 1:
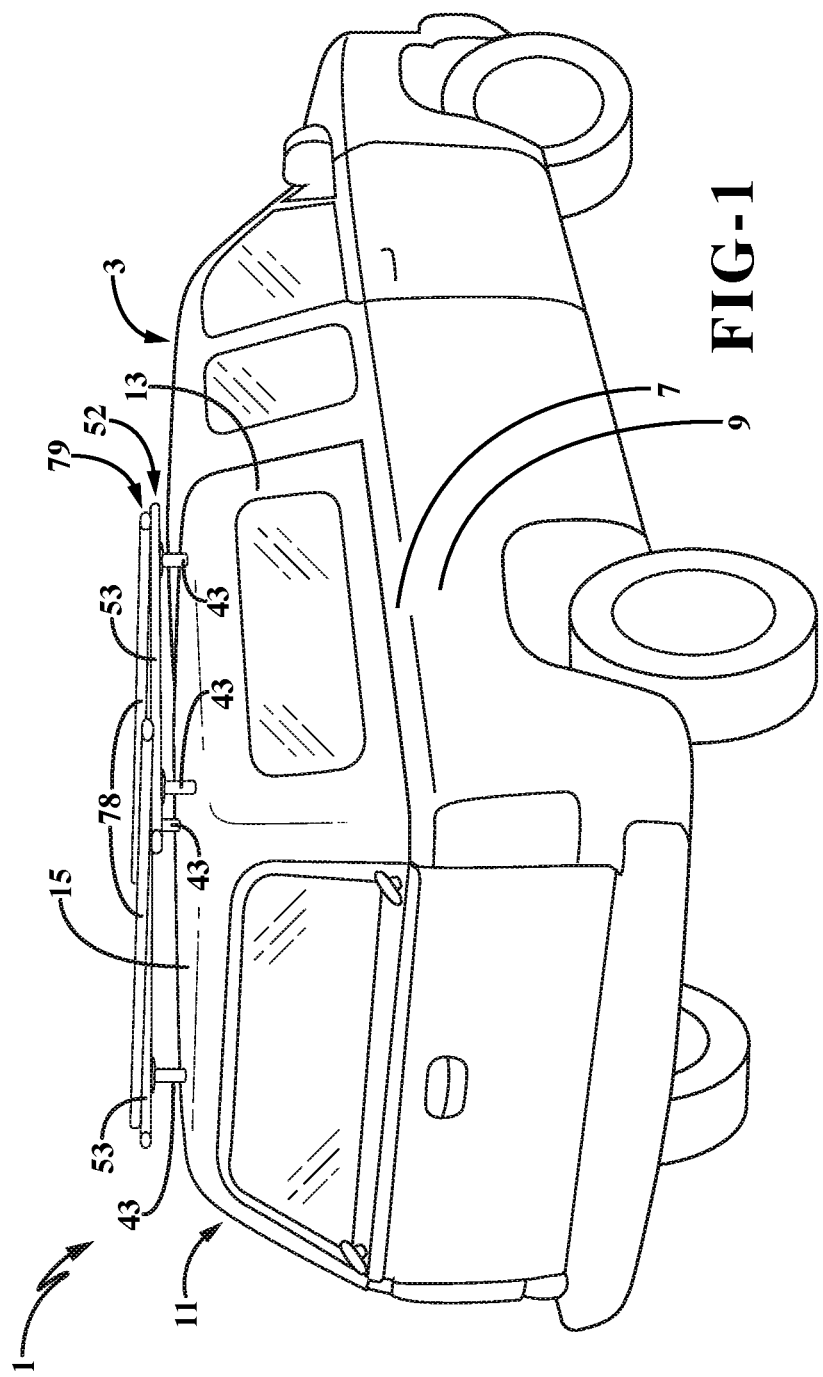
FIG. 1 is a diagrammatic perspective view showing a usual pickup truck having the improved truck cap or enclosure of the present invention mounted thereon.

The truck cap of the present invention is indicated generally at 1, and is shown mounted on a usual vehicle 3 such as a pickup truck, having an open rear cargo area 5 (FIG. 2). Vehicle 3 can have various configurations and will have some type of rear side rails or flanges 7 which extend along the top of vehicle side walls 9 and define cargo area 5. Truck cap 1 includes a usual enclosure indicated generally at 11, which preferably is made out of fiberglass, although it could be made out of wood, aluminum, or other types of material or combination thereof. Enclosure 11 is referred to hereinafter as a shell or cap although it is known by various other nomenclatures as discussed above.

Figure 2A:
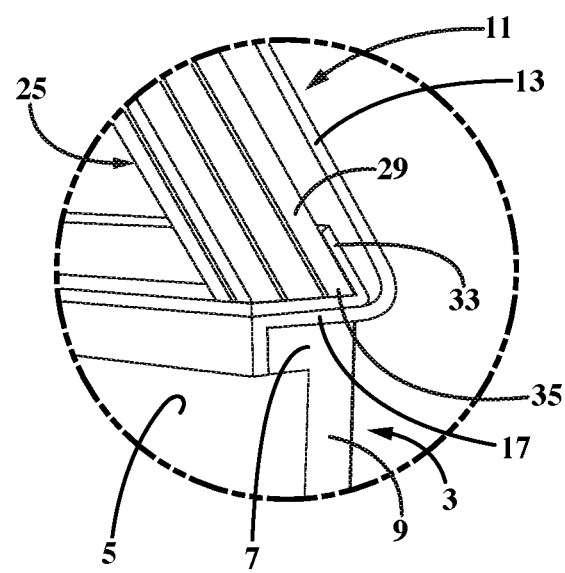
FIG. 2A is an enlarged view of the encircled portion of FIG. 2.

Shell 11 will have a usual construction with side walls 13 and an integral top wall or roof 15. Side walls 13 usually will terminate in some type of inturned bottom flanges 17 which rest on and extend along side rails 7 of the vehicle body as shown in FIGS. 2 and 2A. Bottom flanges 17 of shell 11 are usually secured to the truck body by C-clamps 20 or various other types of fasteners to removeably mount shell 11 on the vehicle body with the weight of the shell being supported on rails 7 of the vehicle body. If desired, shell 11 can be permanently attached by bolts, rivets, etc. to the vehicle body.

Figure 3:
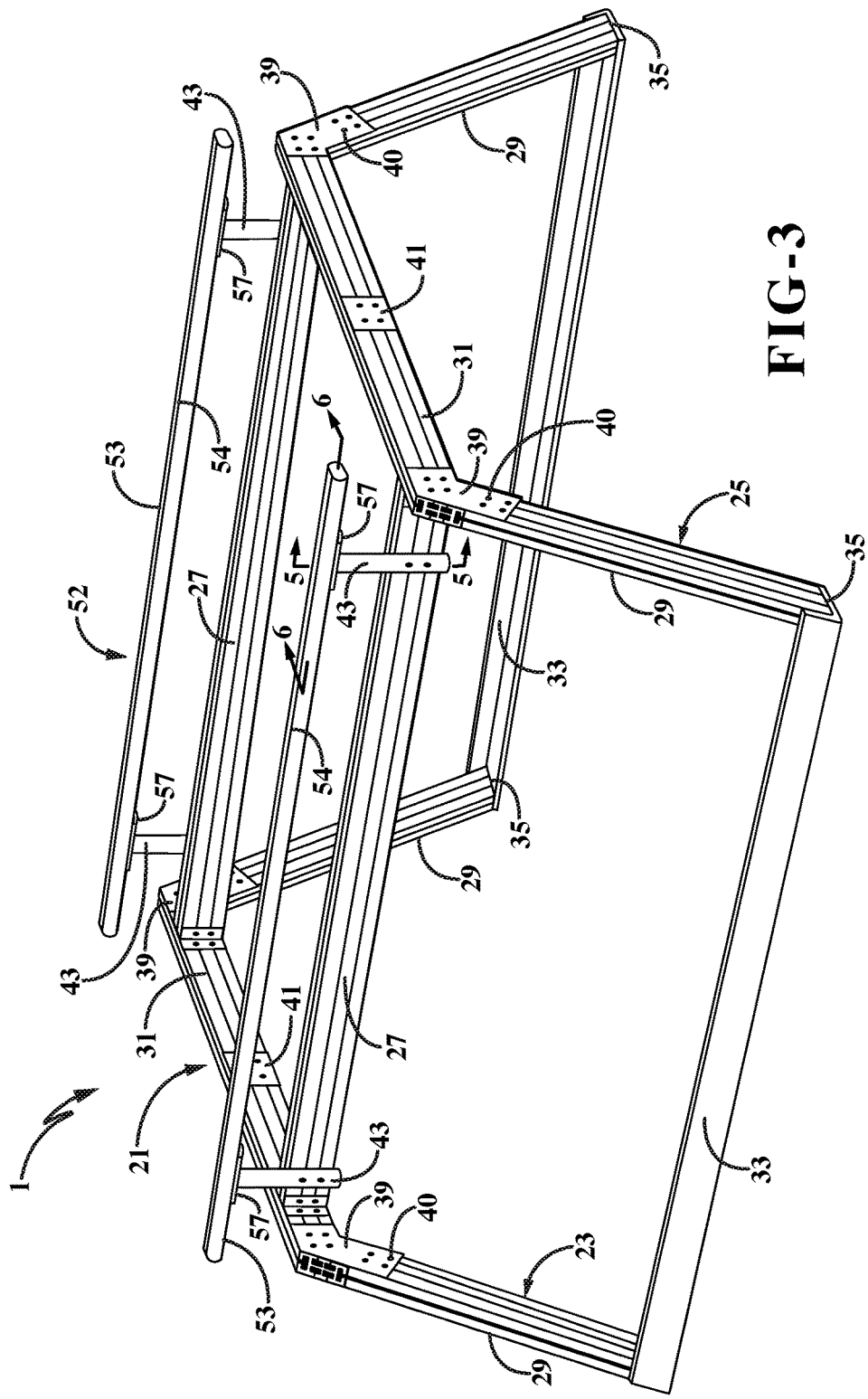
FIG. 3 is a perspective view of the internal frame of the truck cap of the present invention with a ladder rack attached prior to mounting on a pickup truck.

Referring to FIGS. 2 and 3, truck cap 1, in addition to shell 11, includes a rigid internal support frame indicated generally at 21. Frame 21 includes front and rear frame members 23 and 25, respectively, which are connected by a pair of spaced parallel side rails 27 which extend horizontally therebetween. In a first embodiment of frame 21, front and rear frame members 23 and 25 are similar in size and configuration, each being a three-member generally trapezoidal configuration with a pair of side legs 29 and a horizontal cross beam 31. Frame legs 29 are connected to cross beams 31 by angle plates 39 and a plurality of fasteners 40 such as rivets, bolts, T-slot fasteners or other types of well-known fasteners. Cross beams 31 may be a single member or could be two sections connected together by a fastening plate 41.

Figure 5:
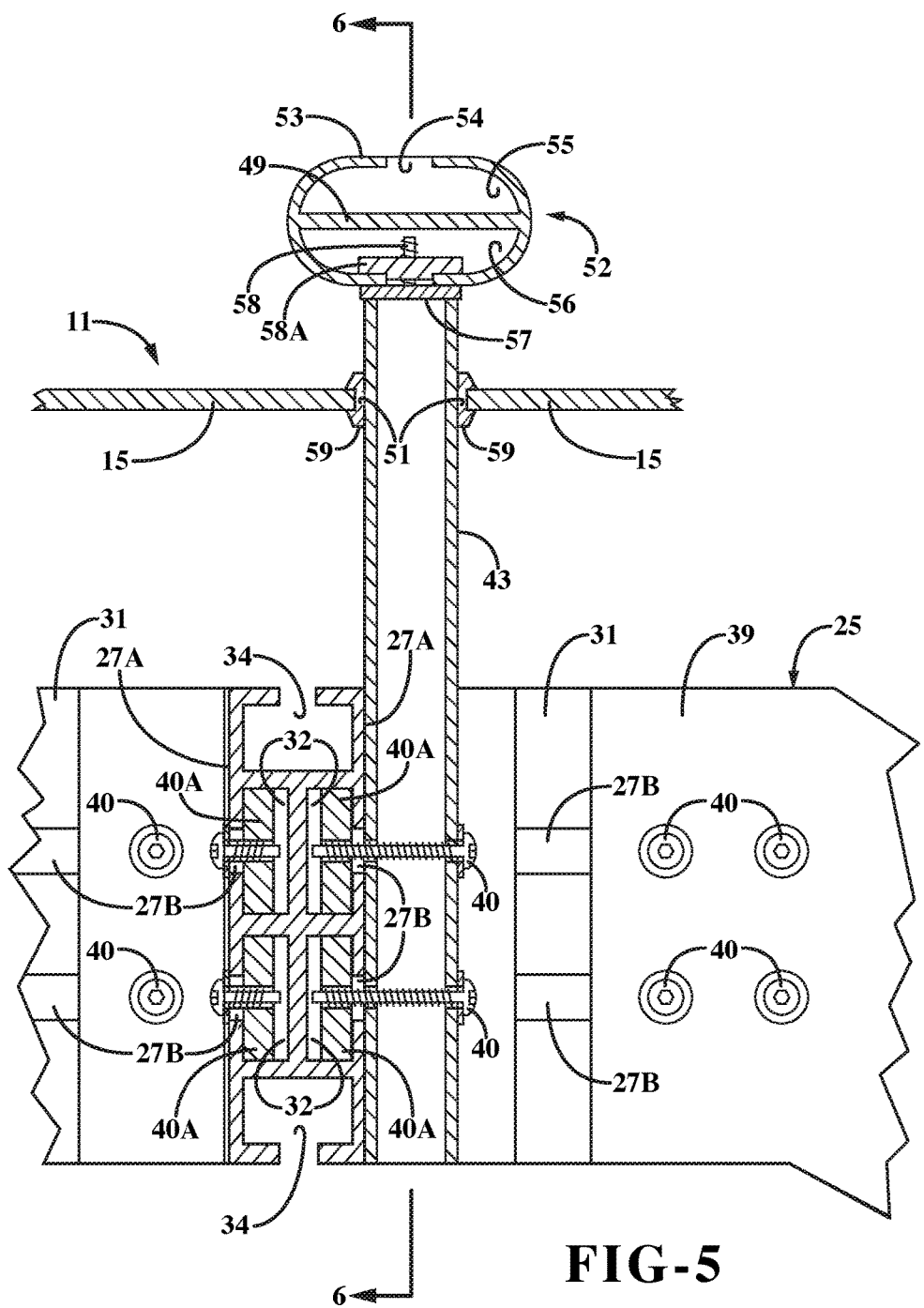
FIG. 5 is an enlarged sectional view taken on line 5-5, FIG. 3.

An angled steel plate 33 extends horizontally between the bottom ends 35 of each pair of legs 29 of the front and rear frame members (FIGS. 2 and 3). Angled plates 35 will rest upon the top of shell flanges 17 and supported on side rails 7 of the vehicle body as shown in FIGS. 2 and 2A. Plates 33 may be connected to frame legs 29 by rivets, bolts, welds, or other types of fasteners (not shown). Plates 33 preferably are secured to the vehicle body side rails by C-clamps 20 or other type fasteners well known in the truck cap industry. Preferably the frame members, and in particular frame legs 29, cross beams 31, and side rails 27 have a double slotted configuration referred to in the industry as double T-slotted members. This type of member is usually formed of an extruded aluminum and referring to side rails 27 in particular as shown in FIG. 5, has spaced outer parallel walls 27A each formed with an aligned pair of slots 27B for receiving fasteners 40 therethrough for engagement with T-slot nuts 40A contained within elongated rectangular-shaped channels 32. Each of the spaced ends of the T-rails 27 have T-shaped slots 34 formed therein. It is readily understood that other types of frame members can be used in forming frame 21 within the concept of the present invention, although the T-rail configuration of the frame members has advantages discussed further below.

In accordance with a feature of the invention, a plurality of posts 43, preferably four, are quadrilaterally placed in a rectangular configuration on the top of frame 21, each being located generally adjacent the junction of side rails 27 with cross beams 31 (FIG. 3). As shown in FIG. 5, each post 43 is connected to its respective side rail 27 by spaced pairs of fasteners 40 and T-slot nuts 40A which sit inside of the elongated channels 32 of the cross beam. Each post 43 preferably is a hollow tubular member which extends vertically upwardly from a respective side rail 27 and extends through aligned holes 51 formed in top wall 15 of shell 11 terminating a short distance above the top of wall 15.

A sealing ring or grommet 59 is placed about the outer circumference of each post 43 within holes 51 to seal the post and shell 11 providing a weatherproof seal therebetween. These seals can be various types of elastomer rings or even some type of applied sealant.

Various types of racks can be attached to the top ends of post 43, one common type being a ladder rack as referred to in the vehicle rack industry, which is indicated generally at 52 and shown on FIGS. 2, 3, and 5. These racks consist of a pair of oval-shaped elongated rails 53 and have a generally oval shape with a longitudinally extending top slot or opening 54 and a pair of internal channels or voids 55 and 56 separated by a wall 49. Rails 53 can be connected to top plates 57 which enclose the open tops of posts 43 by fasteners 58 and elongated nuts 58A. Plate 57 may be attached to the open top of post 43 by welds 64 (FIG. 6) or other type of attachment. It is readily understood that other types of rails or cargo supporting members can be attached to the tops of posts 43 without affecting the concept of the invention.

Figure 4:
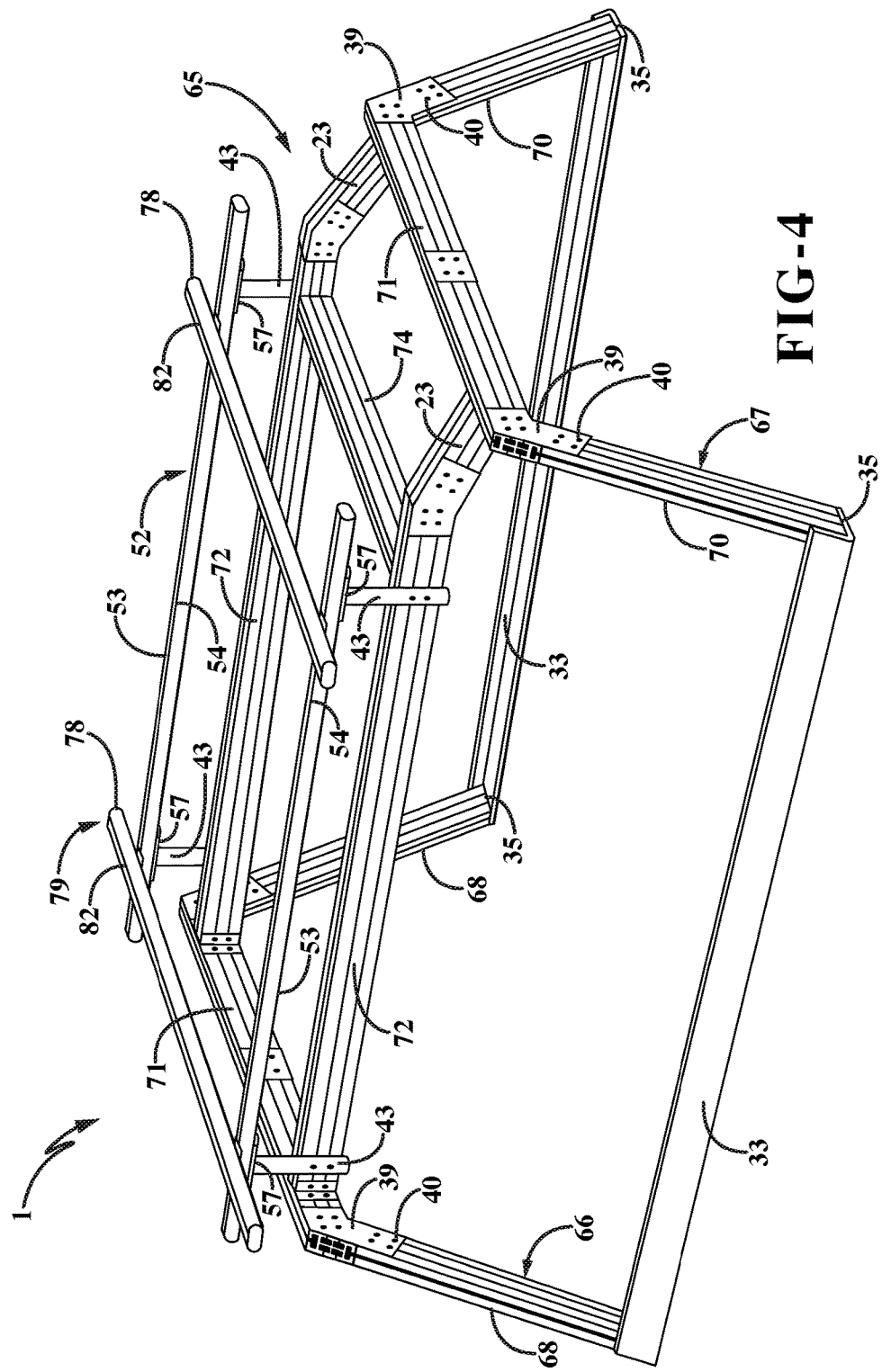
FIG. 4 is a perspective view similar to FIG. 3 showing another embodiment of the internal frame and with a pair of ladder racks attached thereto.

A modified cargo-supporting frame is shown in FIG. 4 and is indicated generally at 65, and will be used with taller end cap shells. Frame 65 will have front and rear frame member 66 and 67 respectively, each having a three member trapezoid configuration. Front frame member 66 will have upwardly angled legs 68 and a horizontal cross beam 69. Rear frame member 67 will have upwardly angled legs 70 and a cross beam 71. Front frame member 66 will be taller than rear frame member 67 and is connected thereto by parallel side rails 72 and a pair of downwardly sloped side rail sections 73 and a connecting cross beam 74.

This modified frame 65 enables a taller inside storage area, yet enables a usual tailgate and window to be installed adjacent the shorter rear frame member 67. This is in contrast to frame 21 discussed above wherein the front and rear frame members are equal in size and configuration.

Figure 6:
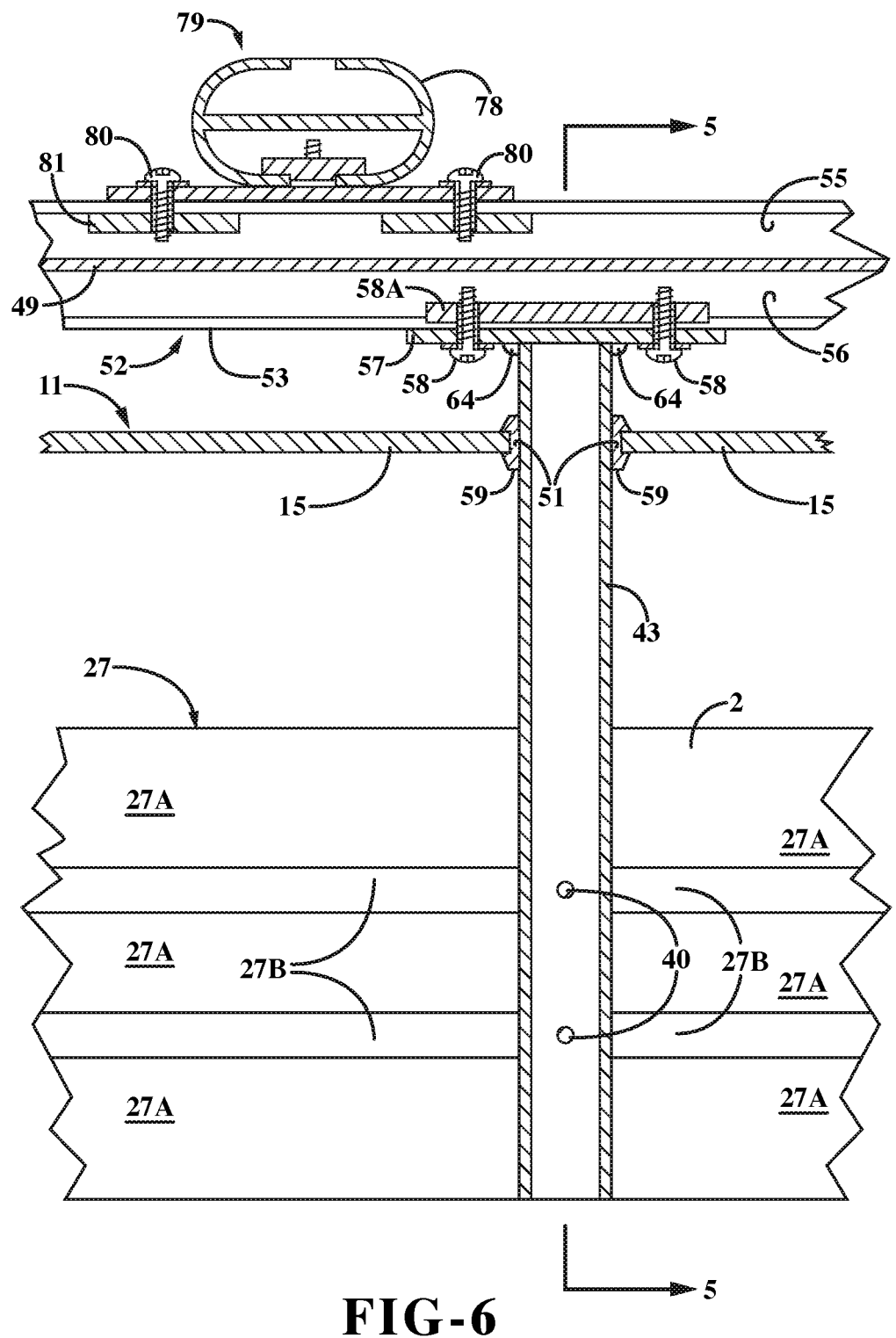
FIG. 6 is an enlarged sectional view taken on line 6-6, FIG. 3.

A usual ladder rack 52 similar to the ladder rack discussed above and attached to frame 21 having two spaced rails 53, can be attached to posts 43 and may have a second ladder rack 79 mounted on ladder rack 52. Rack 79 may be the same as or very similar to ladder rack 52 and have a pair of racks 78 connected to elongated rails 53 by a pair of fasteners or bolts 80 and nuts 81. The spaced pair of rails 78 of ladder rack 79 will extend transversely across rails 53 of ladder rack 52, as shown in FIGS. 1, 4, and 6.

Again, as with the embodiment of FIGS. 2, 3, and 5, this modified frame construction will transfer all of its supported weight onto the truck body through frame 65 and not be placed on the shell which will cover and conceal internal support frame 65. The frame members of frame 65 preferably are formed of the same single or double T-slot members as that of frame 21.

Figure 7:
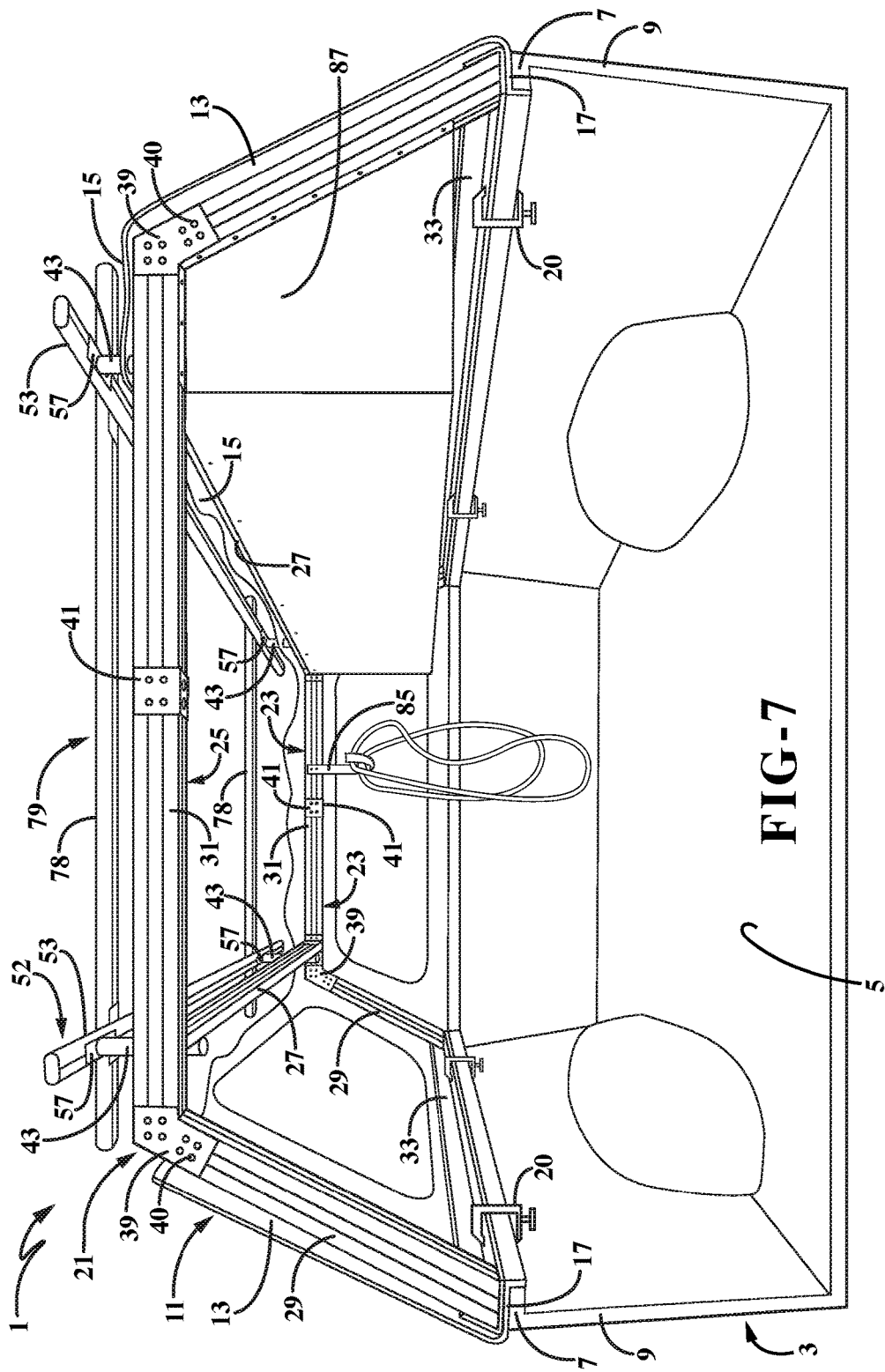
FIG. 7 is an internal rear view similar to FIG. 2 showing a tool box mounted on the internal frame and an example of a tool supported therein.

The forming of frame members 27, 29, and 31 of frame 21 and the frame members 68, 69, 70, 71, 73 and 74 of frame 65 of a T-slot configuration or even a double T-slot configuration as shown in the drawings, provides numerous locations within the cargo storage area, such as shown in FIG. 7, in which various types of hangers 85 can be secured in one or more of the T-shaped grooves for supporting various types of tools or equipment, such as a cable or wire 86 as an example shown in FIG. 7. This provides numerous locations completely along the length and width of the storage area in which to attach various brackets or other supporting hardware for the storage of tools or other equipment. Also, as shown in FIG. 7, an interior tool box 87 can be suspended on one of the side rails and attached to one of the front and rear rails which would be readily accessible either from the interior of the truck cap or through an external door in the covering shell well-known in the art.

Thus, the truck cap of the present invention provides a rigid internal frame which is easily mounted within the truck cargo area by supporting it on the side rails or flanges of the truck body, in combination with a lightweight external shell, which also is supported on the side flanges of the frame of the truck body. This provides a complete weather enclosure to the open cargo area of the truck while providing access thereto by a usual rear gate, rear window, or even side opening windows and doors. The support posts which extend through openings in the top roof of the shell can have various racks or other cargo-supporting structures attached thereto for supporting or containing any type of external load. Most importantly, the weight of any external load or cargo supported on the roof rack is transmitted by the posts to the internal frame directly onto the side walls or flanges of the vehicle body. This avoids any of the load being supported in any manner by the lighter, flexible, outer weather-proof shell. Furthermore, the seals between the posts and holes formed in the shell prevent any water or weather from entering the cargo storage area and causing damage to the stored contents.

It is readily understood that the truck cap of the present invention can be constructed as a combination consisting of the rigid internal frame with the posts extending through and sealed to the outer shell, or can be installed as a retrofit internal frame requiring only four holes to be drilled in the top wall of the shell for insertion of the four posts therethrough, after which seals can be placed in or formed about the post once the frame is properly positioned with respect to the shell.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

The invention claimed is:

1. A truck cap comprising:
   a frame for mounting on side walls of a cargo bed of a truck body including front and back generally vertically and laterally extending frame members connected at an upper end by a pair of longitudinally extending upper rails, the frame members each having a generally trapezoidal configuration comprising a crossbeam portion extending generally laterally between two generally upwardly and laterally inwardly extending side leg portions, each frame member being comprised of elongate frame rails having a rectangular cross-section arranged with a largest dimension of the rectangular cross-section of the elongate frame rails of each frame member in a traverse plane, and the longitudinally extending upper rails being comprised of elongate upper rails having a rectangular cross-section arranged with a largest dimension of the rectangular cross-section of each elongate upper rail extending in a longitudinal plane that is substantially perpendicular to the transverse plane;
   a rigid, non-collapsible, self-supporting shell extending over the frame adapted to be supported on the truck body, said rigid, non-collapsible shell comprising opposite side walls and a roof extending between the side walls;
   a plurality of posts attached to the frame through the roof, each of the posts extending externally above the roof of the rigid, non-collapsible shell; and
   a first rack attached to and extending between at least two of the posts externally of the rigid, non-collapsible shell overlying the roof.

2. The truck cap of claim 1, wherein the pair of longitudinally extending upper rails extend between the crossbeam of the front frame member and the crossbeam of the back frame member.

3. The truck cap of claim 1, wherein the plurality of posts are each attached to at least one of the pair of longitudinally extending upper rails.

4. The truck cap of claim 1, wherein each crossbeam is spaced apart from the roof.

5. The truck cap of claim 1, wherein each of the posts is attached to the frame through a hole in the roof of the rigid, non-collapsible shell.

6. The truck cap of claim 1, wherein each of the posts is attached to the frame and also extends below the rigid, non-collapsible shell through a hole in the roof thereof.

7. The truck cap of claim 1, wherein the rigid, non-collapsible shell is formed of a fiberglass material.

8. A truck cap for mounting on a truck having a cargo bed, the truck cap comprising:
   a rigid frame including front and back frame members connected at an upper end by a pair of longitudinally extending upper rails, each frame member comprising a crossbeam portion extending generally laterally between two frame corners and a pair of generally upwardly and laterally inwardly extending side legs joining the two corners, respectively, the crossbeam portion and side leg being comprised of elongate frame rails having a rectangular cross-section arranged with a largest dimension of the rectangular cross-section of the elongate frame rails of each frame member in a traverse plane, and the longitudinally extending upper rails being comprised of elongate upper rails having a rectangular cross-section arranged with a largest dimension of the rectangular cross-section of each elongate upper rail extending in a longitudinal plane that is substantially perpendicular to the transverse plane, the rigid frame being supportable by the side walls of the cargo bed of the truck to extend over the cargo bed;

a rigid, non-collapsible, self-supporting shell covering the rigid frame and including a shell roof extending between and joined to a pair of shell side walls at shell corners with each crossbeam portion of the frame extending adjacent the shell roof and each side leg of the frame extending adjacent the shell side walls, respectively, said rigid, non-collapsible shell being arranged about the frame such that the crossbeams are disposed below the roof and are spaced apart therefrom;

a plurality of posts attached to the rigid frame through the shell roof between the shell corners, each of the posts extending externally above the roof of the rigid, non-collapsible shell; and a first rack attached to and extending between at least two of the posts externally of the rigid, non-collapsible shell overlying the roof, wherein when a weight of a load is supported on the rack and the rack is mounted on the truck, the weight is transferred to the truck through the rigid frame.

9. The truck cap of claim 8, wherein the pair of longitudinally extending upper rails extend between the crossbeam of the front frame member and the crossbeam of the back frame member.

10. The truck cap of claim 8, wherein the plurality of posts are each attached to at least one of the pair of longitudinally extending upper rails.

11. The truck cap of claim 8, wherein each of the posts is attached to the frame through a hole in the roof of the rigid, non-collapsible shell.

12. The truck cap of claim 8, wherein each of the posts is attached to the frame and also extends below the rigid, non-collapsible shell through a hole in the roof thereof.

13. The truck cap of claim 8, wherein the rigid, non-collapsible shell is formed of a fiberglass material.

14. A truck cap for mounting on a truck having a cargo bed, the truck cap comprising:

a rigid frame for mounting on side walls of the cargo bed to overlie the cargo bed of the truck, said rigid frame including front and back generally vertically and laterally extending frame members connected at an upper end by a pair of longitudinally extending upper rails, the frame members each having a generally trapezoidal configuration comprising a crossbeam extending generally laterally between two generally upwardly and laterally inwardly extending side legs, the crossbeam and side legs being comprised of an elongate frame rails having a rectangular cross-section arranged with a largest dimension of the rectangular cross-section of the elongate frame rails of each frame member in a traverse plane, and the longitudinally extending upper rails being comprised of elongate upper rails having a rectangular cross-section arranged with a largest dimension of the rectangular cross-section of each elongate upper rail extending in a longitudinal plane that is substantially perpendicular to the transverse plane, and a rigid, non-collapsible, self-supporting shell extending over the frame and adapted to be supported on the truck to overlie the cargo bed, said rigid, non-collapsible shell comprising opposite shell side walls and a roof extending between and joined to the shell side walls, the rigid, non-collapsible shell extending over the rigid frame with each crossbeam of the rigid frame being spaced apart from the shell roof, and each side leg of the rigid frame extending adjacent to one of the shell side walls.

15. The truck cap of claim 14, wherein the pair of longitudinally extending upper rails extend between the crossbeam of the front frame member and the crossbeam of the back frame member.

16. The truck cap of claim 14, wherein at least an upper end of each shell side wall is supportable with each side leg of the rigid frame being interiorly spaced away from the adjacent shell side walls, respectively.

17. The truck cap of claim 14, further comprising a hanger coupled to the rigid frame.

18. The truck cap of claim 14, further comprising a storage box coupled to the rigid frame.

19. The truck cap of claim 14, wherein the rigid, non-collapsible shell is formed of a fiberglass material.

20. The truck cap of claim 14, further comprising a plurality of posts attached to the frame and extending above the roof.

21. The truck cap of claim 20, wherein each of the posts passes through a hole in the roof to further extend internally below the roof of the rigid, non-collapsible shell.

22. The truck cap of claim 14, wherein the shell further comprises bottom flanges inwardly extending from the shell side walls and adapted to be supported on truck side walls of the cargo bed.

23. The truck cap of claim 22, wherein the side legs of the rigid frame sits upon top surfaces of the bottom flanges of the shell, wherein, when mounted onto the truck, the side legs overlie the truck side walls spaced apart by the bottom flanges.

* * * * *

UNITED STATES PATENT AND TRADEMARK OFFICE
CERTIFICATE OF CORRECTION

PATENT NO. : 10,000,114 B2
APPLICATION NO. : 15/245717
DATED : June 19, 2018
INVENTOR(S) : Rohr et al.

Page 1 of 1

It is certified that error appears in the above-identified patent and that said Letters Patent is hereby corrected as shown below:

On the Title Page

Column 1, (*) Notice, Line 3, delete "days. days." and insert --days.-- therefor Signed and Sealed this
Twenty-first Day of August, 2018

Andrei Iancu
*Director of the United States Patent and Trademark Office*